US006385305B1

(12) United States Patent
Gerszberg et al.

(10) Patent No.: US 6,385,305 B1
(45) Date of Patent: May 7, 2002

(54) VIDEO PHONE MULTIMEDIA ANNOUNCEMENT MESSAGE TOOLKIT

(75) Inventors: Irwin Gerszberg, Kendall Park; Jeffrey S. Martin, Dover; Hopeton S. Walker, Haledon, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/001,345

(22) Filed: Dec. 31, 1997

(51) Int. Cl.$^7$ .............................. H04M 1/64; H04N 7/14
(52) U.S. Cl. ................................. 379/88.13; 348/14.06
(58) Field of Search .............................. 348/14, 15, 16, 348/14.01, 14.06, 14.07; 379/67.1, 88.12, 88.13

(56) References Cited

U.S. PATENT DOCUMENTS

| | | |
|---|---|---|
| 4,456,925 A | 6/1984 | Skerlos et al. |
| 4,620,289 A | 10/1986 | Chauvel |
| 4,725,694 A | 2/1988 | Auer et al. |
| 4,829,555 A | 5/1989 | Hashimoto |
| 4,916,441 A | 4/1990 | Gombrich |
| 5,014,267 A | 5/1991 | Tompkins et al. |
| 5,046,079 A | 9/1991 | Hashimoto |
| 5,157,717 A | 10/1992 | Hitchcock |
| 5,189,691 A | 2/1993 | Dunlap |
| 5,220,599 A | 6/1993 | Sasano et al. |
| 5,276,731 A | 1/1994 | Arbel et al. |
| 5,283,818 A | 2/1994 | Klausner et al. |
| 5,327,486 A | 7/1994 | Wolff et al. |
| 5,335,276 A | 8/1994 | Thompson et al. |
| 5,393,964 A | 2/1995 | Hamilton et al. |
| 5,394,445 A | 2/1995 | Ball et al. |
| 5,406,615 A | 4/1995 | Miller, II et al. |
| 5,434,908 A | 7/1995 | Klein |
| 5,479,411 A | 12/1995 | Klein |
| 5,488,412 A | 1/1996 | Majeti et al. |
| 5,512,935 A | 4/1996 | Majeti et al. |
| 5,534,913 A | 7/1996 | Majeti et al. |
| 5,546,316 A | 8/1996 | Buckley et al. |
| 5,550,754 A | 8/1996 | McNelley et al. |
| 5,561,604 A | 10/1996 | Buckley et al. |
| 5,572,005 A | 11/1996 | Hamilton et al. |
| 5,583,920 A | 12/1996 | Wheeler, Jr. |
| 5,583,965 A | 12/1996 | Douma et al. |
| 5,584,054 A | 12/1996 | Tyneski et al. |
| 5,587,735 A | 12/1996 | Ishida et al. |
| 5,604,791 A | 2/1997 | Lee |
| 5,619,684 A | 4/1997 | Goodwin et al. |
| 5,644,628 A | 7/1997 | Schwarzer et al. |
| 5,671,267 A | 9/1997 | August et al. |
| 5,682,195 A | 10/1997 | Hendricks et al. |
| 5,684,918 A | 11/1997 | Abecassis |
| 5,760,823 A * | 6/1998 | Brunson et al. ............... 348/14 |
| 5,778,053 A * | 7/1998 | Skarbo ...................... 348/14 X |
| 5,896,165 A * | 4/1999 | Rao ............................. 348/14 |
| 5,905,524 A | 5/1999 | Sauer |
| 5,999,207 A * | 12/1999 | Rodriguez et al. ............. 345/14 |
| 6,005,566 A * | 12/1999 | Jones et al. .................. 345/333 |
| 6,031,529 A * | 2/2000 | Migos et al. ................. 345/340 |

OTHER PUBLICATIONS

"A Window–Based Editor for Digital Video and Audio", Rangan et al., IEEE, pp. 640–648, Dec. 1992.*
"A Multimedia query User Interface", Hirzalla et al., IEEE, pp. 590–593, Dec. 1995.*
"Interactive Modular Graphical User INterface Development for Telesensations Systems", Di Rossi et al., IEEE, pp. 1604–1608, Dec. 1997.*
US Patent Application 08/943,312 filed Oct. 14, 1997, entitled Wideband Communication System for the Home, to Robert R. Miller, II and Jesses E. Russell, 21 pages.
US Patent Application 08/858,170 filed May 14, 1997, entitled Wide Band Transmission Through Wire, to Robert R. Miller, II, Jesse E. Russell and Richard R. Shively, 15 pages.

* cited by examiner

*Primary Examiner*—Scott L. Weaver

(57) ABSTRACT

A toolkit for creating customized video announcement messages on video-enabled answering machine. The video-enabled answering machine may have many new features including customized video announcement messages, caller ID based video announcement messages, and time based video announcement messages.

10 Claims, 15 Drawing Sheets

VIDEO PHONE MULTIMEDIA ANNOUNCEMENT MESSAGE TOOLKIT

FIELD OF THE INVENTION

The present invention is directed generally to telephone answering machines, and more particularly to a toolkit for creating announcements for a multimedia answering machine.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and maling it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services.

A problem that has plagued many telephone users is the endless phone hierarchies where a customer calls a company or government office and becomes mired in an endless array of menu choices—none of which seem to guide the individual to where he or she would like to go. Often the answering machine will simply hang-up on the individual at the end of one menus without ever providing the individual the information requested. Users often become frustrated at not being able to speak with a human being.

Another problem for many users of telephone answering machines is that it is very difficult to customize a telephone answering machine to reflect the personality of the owner of the machine. We customize our business cards, holiday cards, and letter head, employ different advertising, and decorate our offices to reflect our own personalities, to draw attention to ourselves, and to differentiate our services. However, heretofore, it has been difficult to customize our voice announcement messages. Although some users have added music through the use of a tape recorder playing while the user is recording an announcement, these attempts at customizing a voice greeting are crude and at best cumbersome to use.

As a further problem, users which are placed on-hold are either provided comfort noise, music, and/or advertisements from the company to which they called. Time on hold often passes very slowly and many users may hang-up. Home users without sophisticated PABX (Private Automatic Branch Exchange) machines are even more disadvantages since these users usually only can provide comfort noise to their customers which are place on-hold.

SUMMARY OF THE INVENTION

In order to provide an improved network it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user, an intelligent services director (ISD) disposed at or near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a toolkit for creating announcements for a multimedia announcement answering machine. The users may record video greetings for their answering machine. The video greetings may include animations and other suitable audio/video clips. Still images may also be presented.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 5 illustrates an embodiment of a display on the videophone shown in FIG. 3a.

FIGS. 10–12 illustrate various embodiments of a display on the videophone shown in FIG. 3a.

DETAILED DESCRIPTION OF PREFERRED EMBODIMENTS

Figure 1:
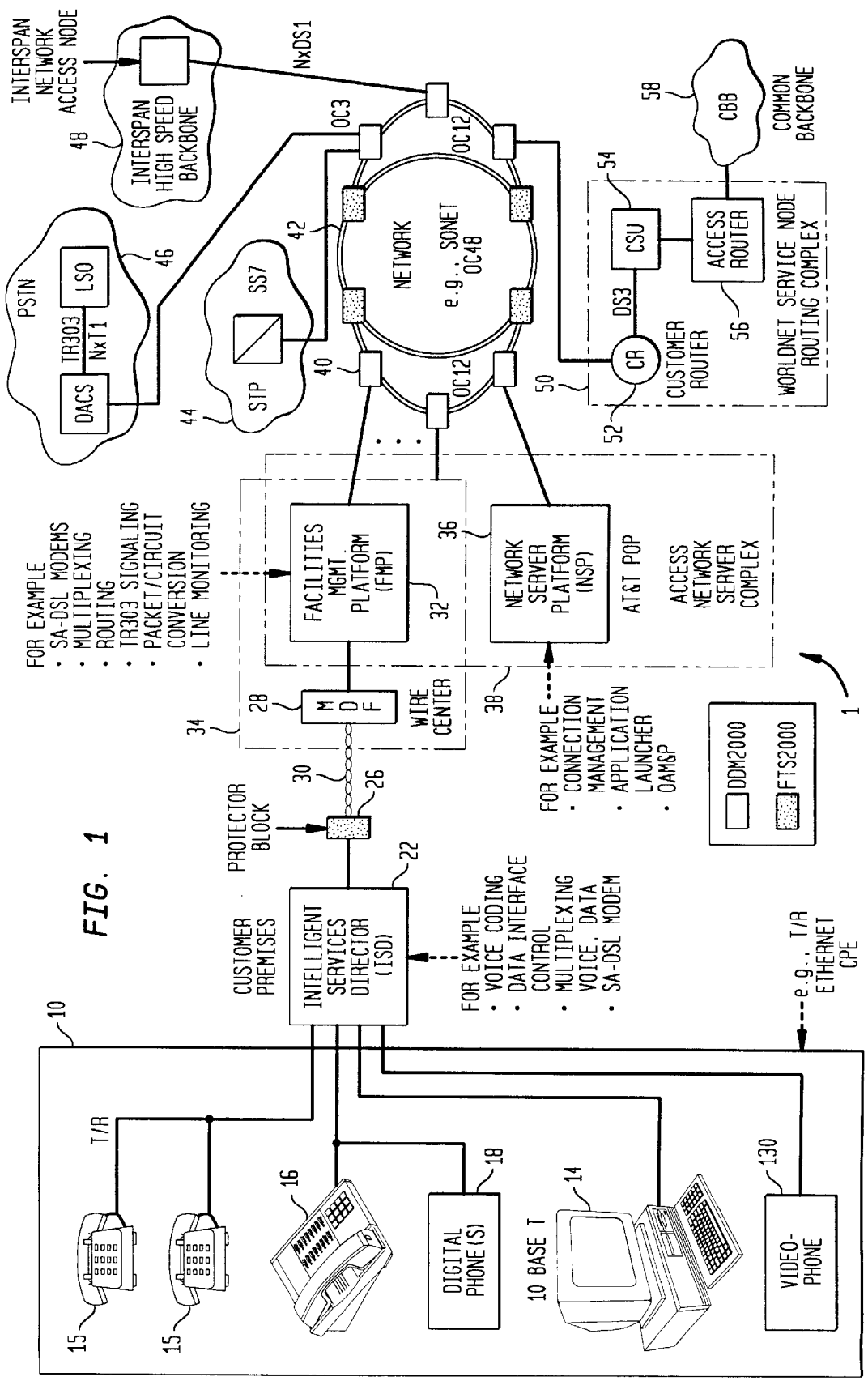
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Referring to FIG. 1, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

Figure 2:
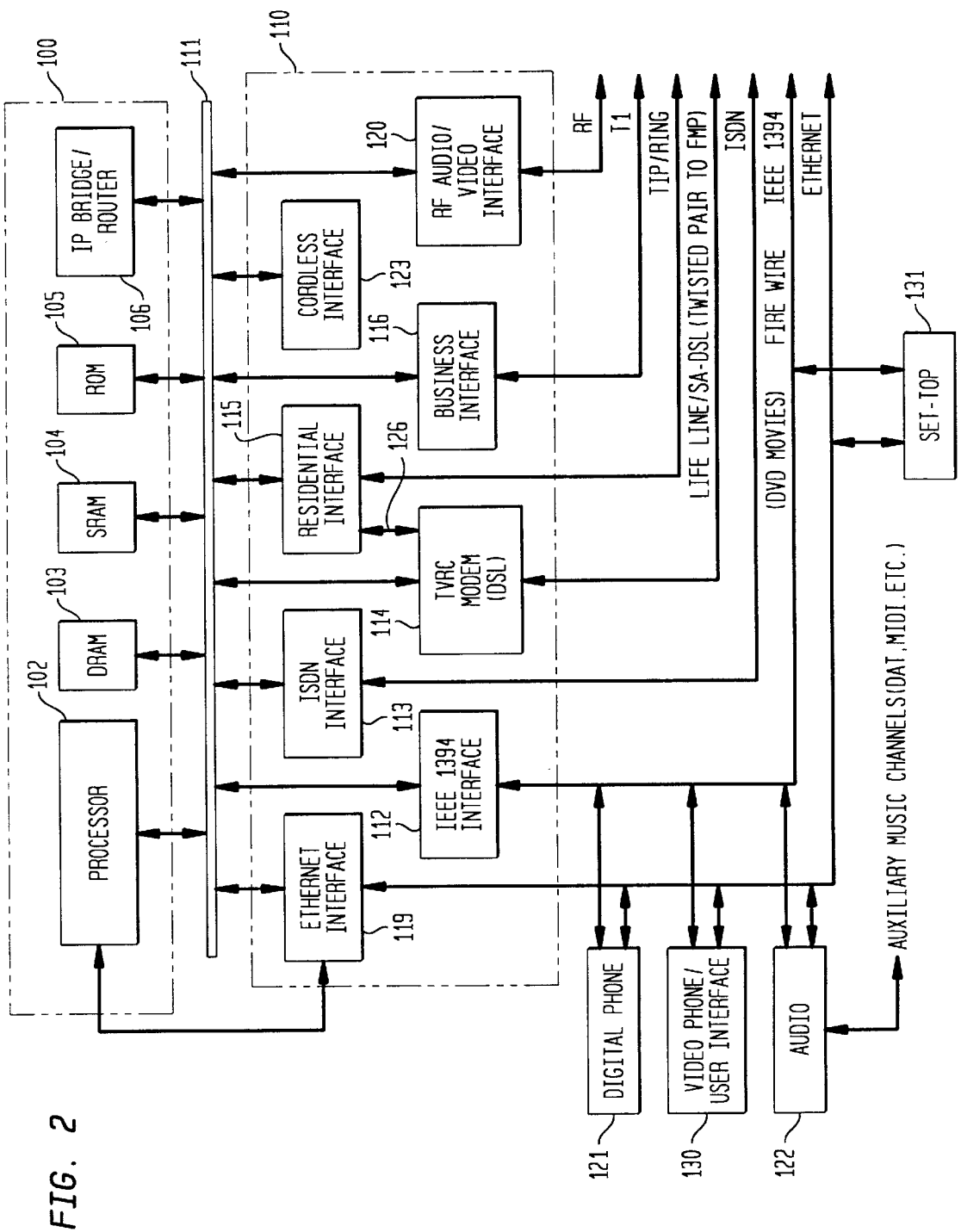
FIG. 2 is a block diagram of an embodiment of an intelligent services director consistent with the architecture shown in FIG. 1.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include one or more of an integrated services digital network (ISDN) interface 113, an Ethernet interface 119 (e.g., for 28.8 kbs data, 56 kbs data, or ISDN), an IEEE 1394 "fire wire" interface 112 (e.g., for a digital videodisc device (DVD)), for a digital subscriber line (DSL) modem (e.g., a TVRC modem interface), a residential interface 114, (e.g., standard POTS phone systems such as tip ring), a business interface 116 (e.g., a T1 line and/or PABX interface), a radio frequency (RF) audio/video interface 120 (e.g., a cable television connection), and/or a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone / user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be prepogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/ movie in real time for immediate viewing and/or into storage for later viewing.

Figure 3A:
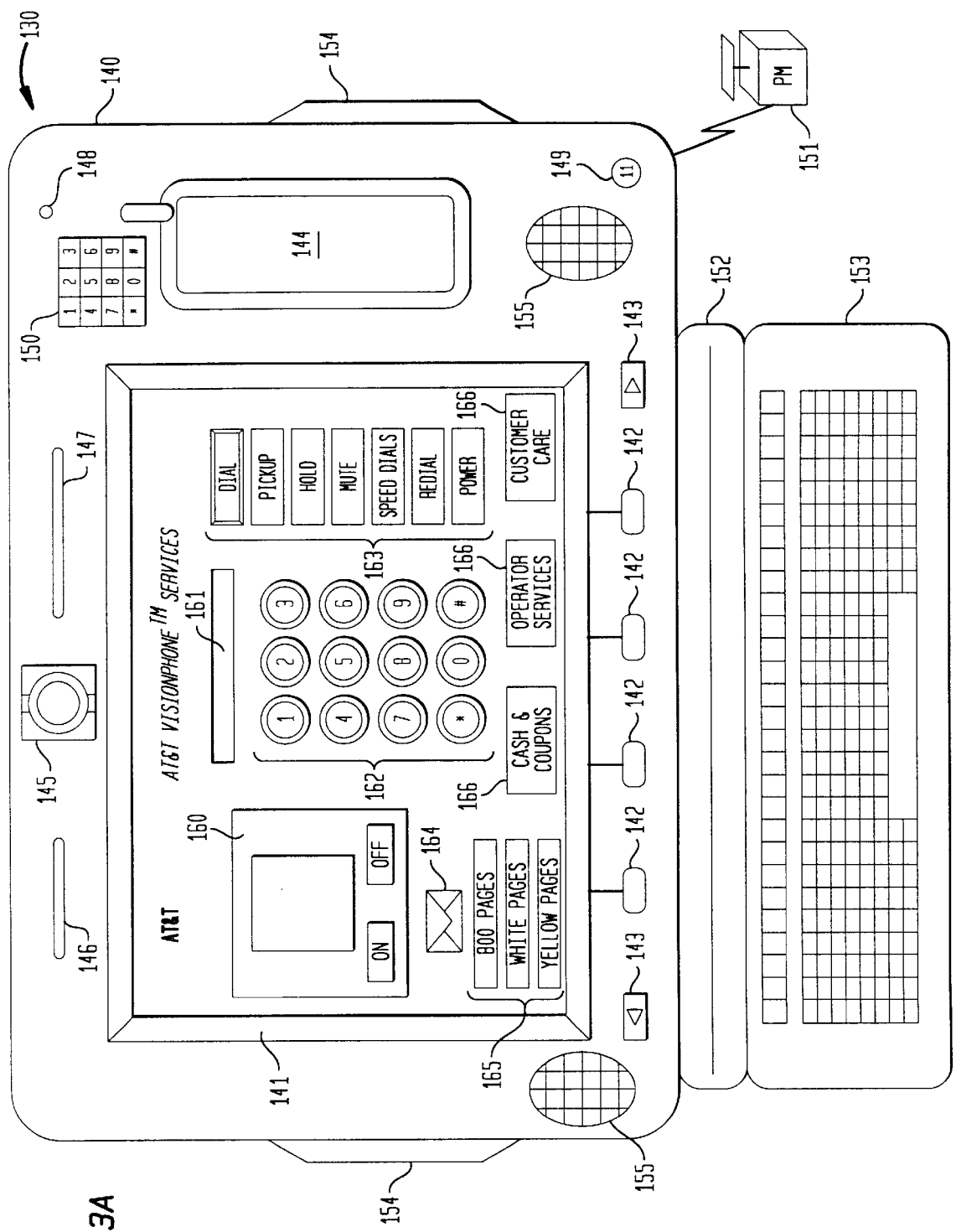
FIGS. 3A and 3B illustrate an embodiment of a video phone consistent with the architecture shown in FIG. 1.
Figure 3B:
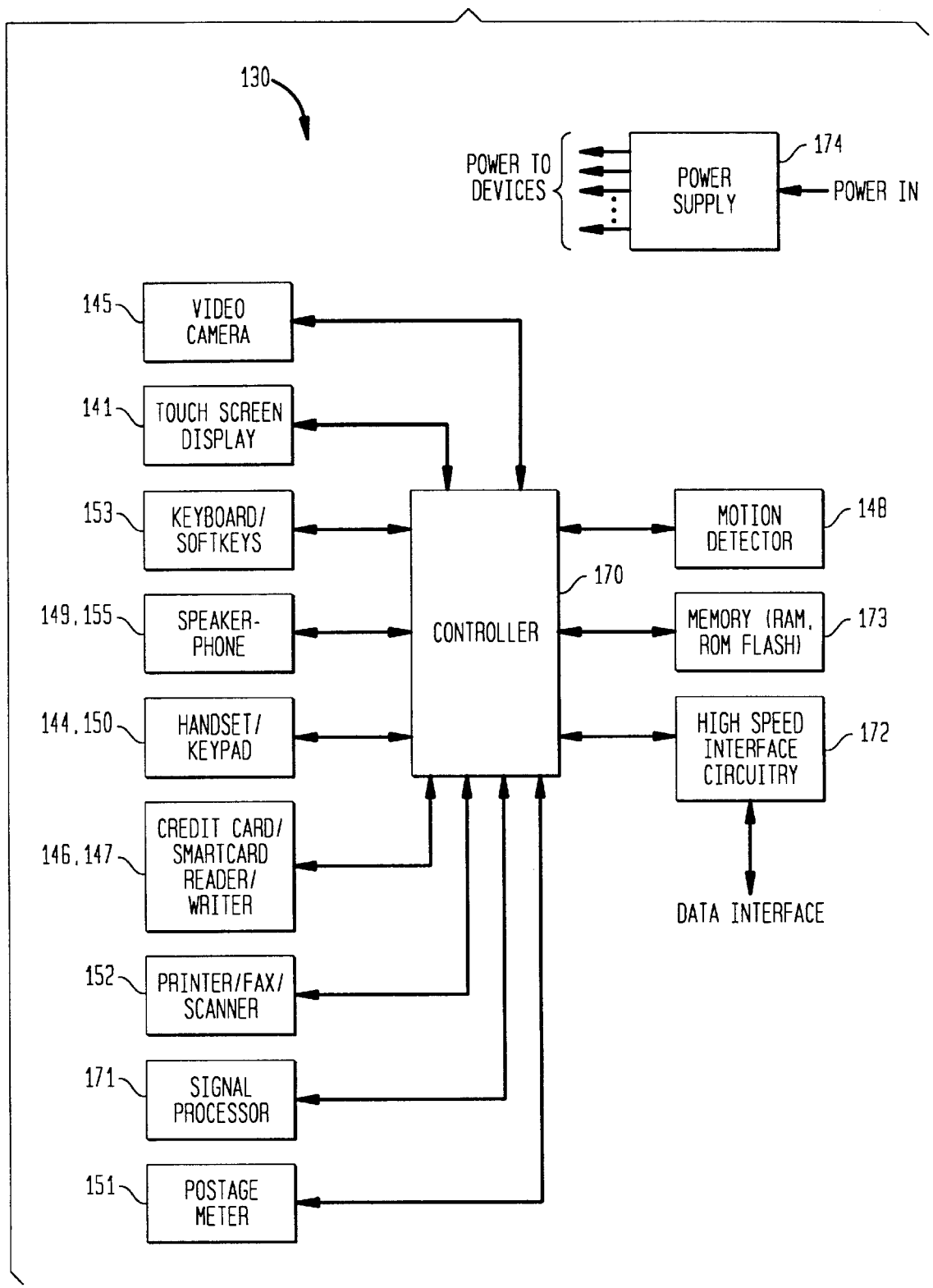

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key maybe displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
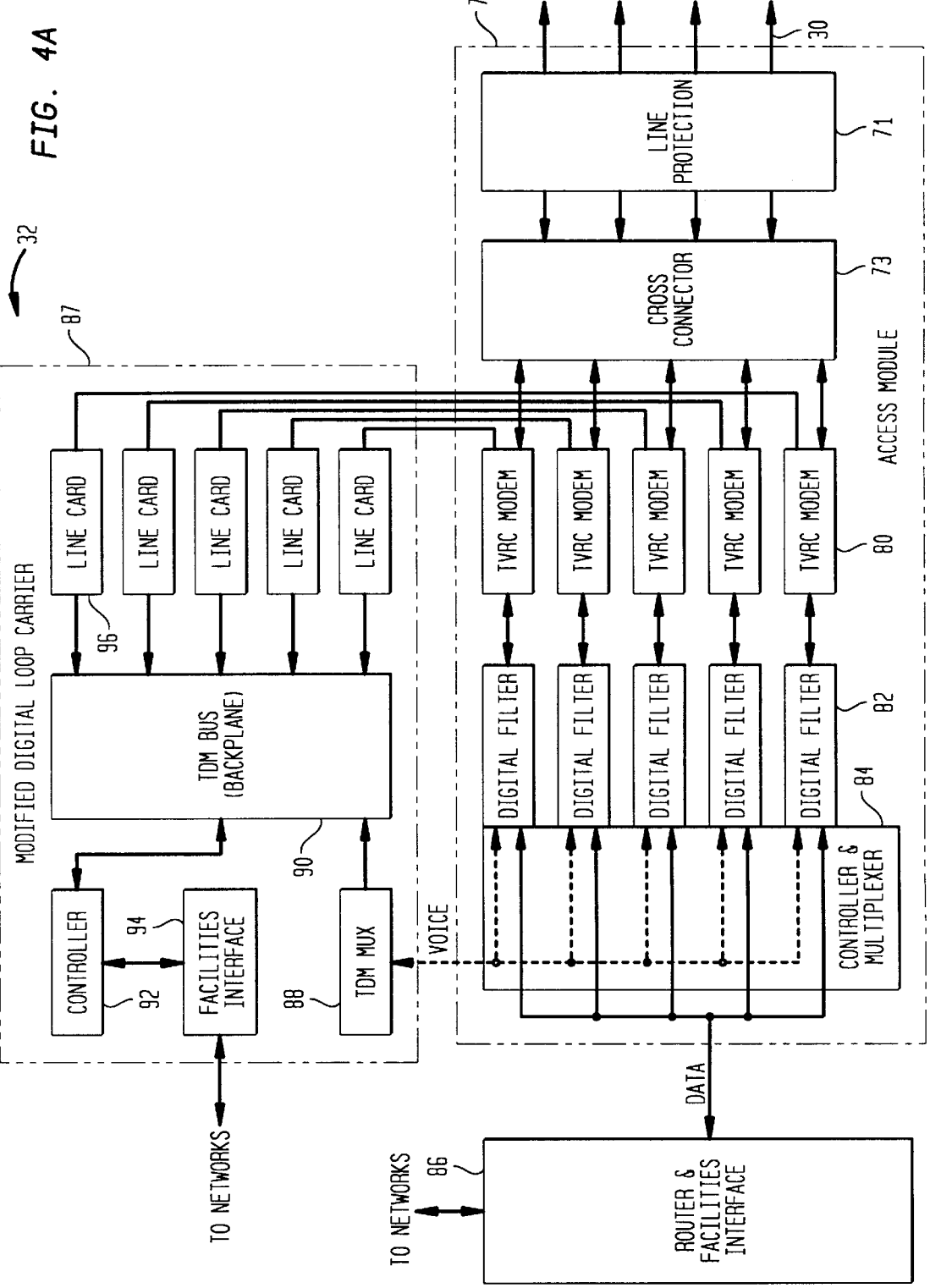
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication via PDTS is ensured despite a failure of the digital data link. The fine cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
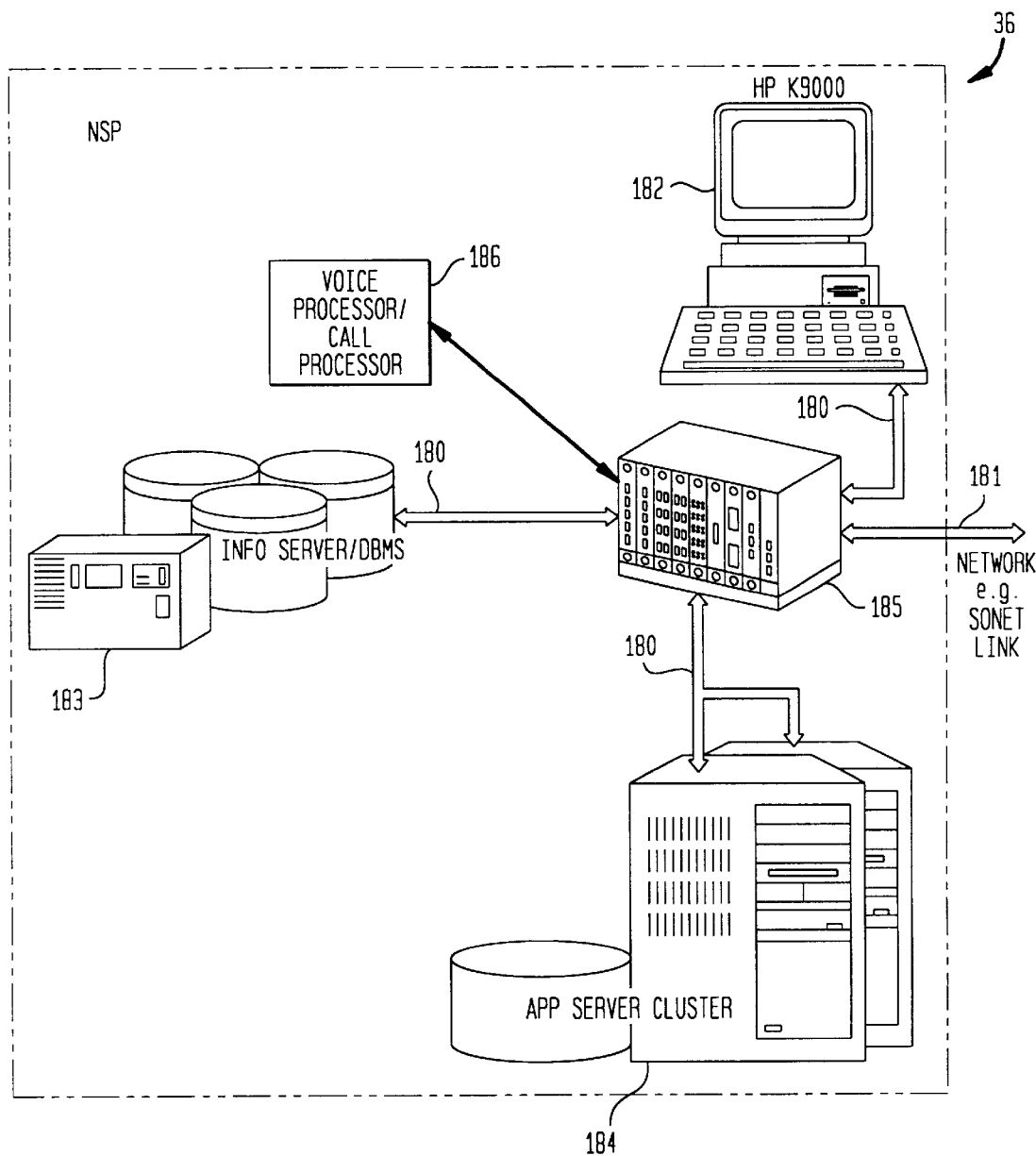
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

The NSP 36, FMP 32, ISD 22, and/or videophone 130 may host a multimedia announcement answering machine which may be either a standard format and/or customized by individual users. FIGS. 6–9 provide various examples of multimedia announcement messages that may appear on videophone-enabled telephones.

Figure 5:
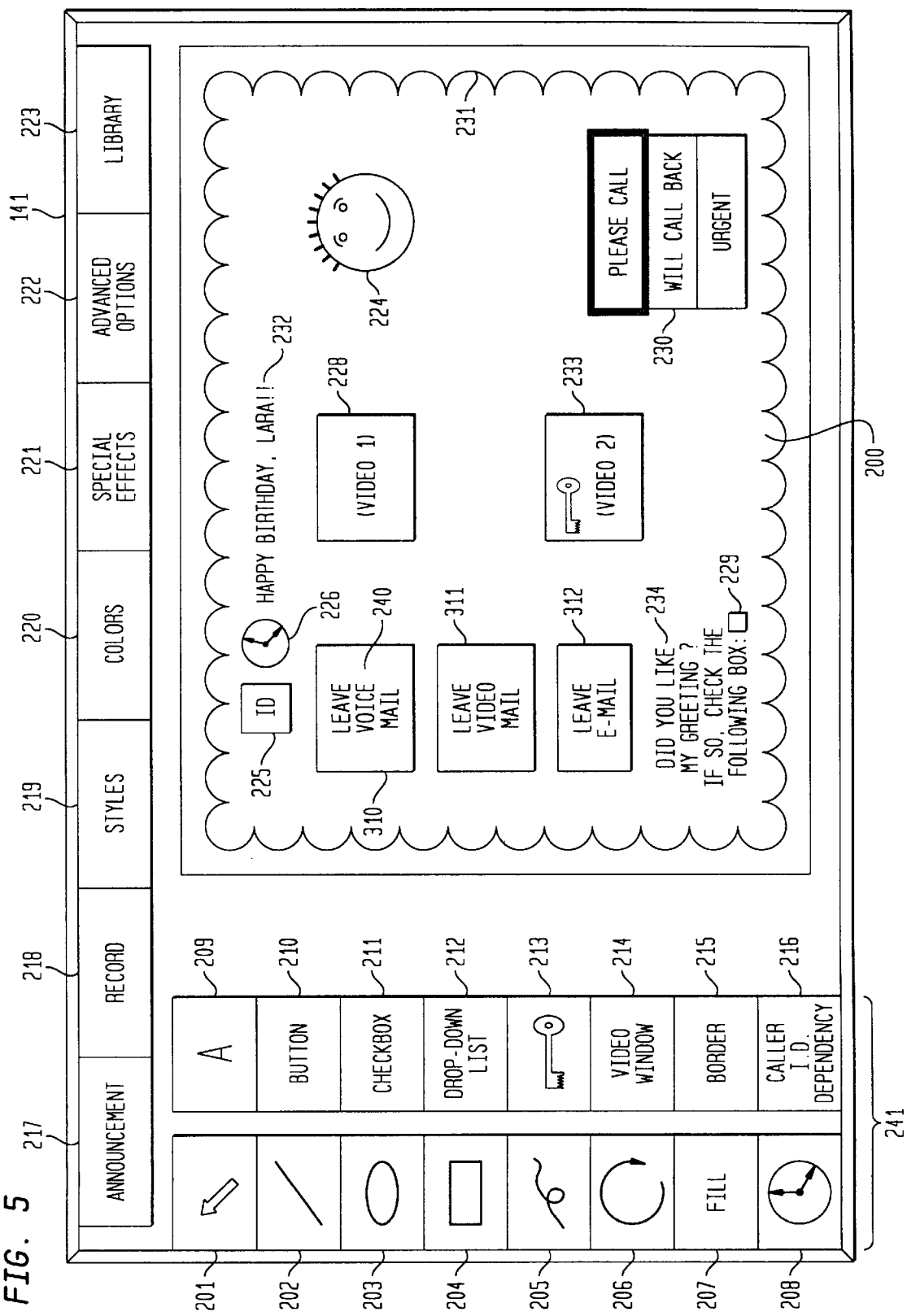

Referring to FIG. 5, a user of the videophone 130 may record standard and/or customized multimedia greetings for the answering machine. The user may create a greeting by using, for example, a toolkit application. The toolkit application may be resident as hardware, software, and/or firmware on the videophone 130, the NSP 36, the FMP 32, the ISD 22, and/or any other network server. The toolkit application may be a downloadable applet and/or may be updated in the same manner as the other applets mentioned above. The toolkit application may include a variety of tool buttons 201–216 on a toolbar 241 and/or pull-down menus 217–223 to aid the user in customizing a greeting. Examples of tools that may be provided via tool buttons include a selection tool 201 for selecting, dragging, and/or dropping objects, a line tool 202 for drawing lines, an oval tool 203 for drawing circles and/or ovals, a box tool 204 for drawings squares, rectangles, and/or other polygons, a freehand drawing tool 205, a rotate/flip tool 206 for rotating and flipping objects, a fill tool 207 for filling enclosed objects with a color and/or pattern, a time/date tool 208 for applying time and/or date dependencies to objects, a text input/editing tool 209, a button creation tool 210, a checkbox creation tool 211, a drop-down list creation tool 212, a password protection tool 213, a video window creation tool 214, a border creation tool 215, and/or a caller identification tool 216 for applying caller identification dependencies to objects.

Drop-down menus may also be available to the user. When selected, a drop-down menu may present a list of drop-down functions. For instance, an announcement drop-down menu 217 may present drop-down functions such as new announcement, edit announcement, erase announcement, and/or assign an announcement with a particular user. A record drop-down menu 218 may present drop-down functions such as record audio/video, record video only, and/or record audio only. A styles drop-down menu 219 may present drop-down functions such as text style, line style, button style, and/or border style. A colors drop-down menu 220 may present drop-down functions such as color and/or pattern. A special effects drop-down menu 221 may include drop-down functions such as slow-motion video, freeze-frame, object shadow, video contrast, video hue, video brightness, video colors, video filters, audio filters, echo, and/or animation. An advanced options drop-down menu 222 may present drop-down functions such as time, date, security, and/or caller identification dependencies with regard to an entire message, as well as special mail boxes for different users. A library drop-down menu 223 may present functions such as retrieve standard and/or saved objects, and/or download objects from a central database. Such saved and/or downloadable objects may be stored in the customer premise equipment 10 such as the videophone itself, the ISD 22, the FMP 32, the NSP 36, and/or other networks.

Objects that may be manipulated, configured, created, erased, and/or otherwise modified by these tools and drop-down functions include shapes/figures/drawings (e.g., drawing 224), dependency icons (e.g., dependency icons 225–227), windows (e.g., video windows 228, 233), buttons (e.g., buttons 301–306, 310–315, 320, 321, 331, 350, 353, 354, shown in FIGS. 5–10), checkboxes (e.g., checkbox 229), drop-down lists (e.g., drop-down list 230), borders (e.g., border 231), text (e.g., text 232, 234), background images, and/or any other graphic representation.

Some or all of the objects may be configured by, for example, single or double-tapping on the objects (if the videophone is equipped with a touch-screen display) or selecting them by single or double-clicking a mouse button (if the videophone is attached to a mouse input device). Password dependency icons 227 may be configured with one or more passwords. Caller identification dependency icons 225 may be configured with one or more callers' identifications. Time/date dependency icons 226 may be configured with one or more dates and/or times. Buttons may be configured with button size and/or button labels (i.e., the text printed on a button, such as button label 240) and/or functions. Drop-down lists 230 may be configured with text listings.

Dependencies may be applied to various objects. Any object may be configured to appear in the announcement only if certain conditions are met, such as a certain time, date, and/or caller, and/or if a password is entered. Thus, a user that wants to display the text 232 "Happy birthday, Lara!!" only when Lara calls and only on a certain date (e.g., Lara's birthday) may, using the caller identification tool 216 drag and drop a caller identification dependency icon 225 at the text 232. The user may, using the time/date tool 208, drag and drop a time/date dependency icon 226 at the text 232. The time/date dependency icon 226 may then be configured by the user to allow the text 232 to appear in the announcement on the date of Lara's birthday. Also, the caller identification dependency icon 225 may be configured to allow the text 232 to appear in the announcement if the caller is Lara.

Figure 6:
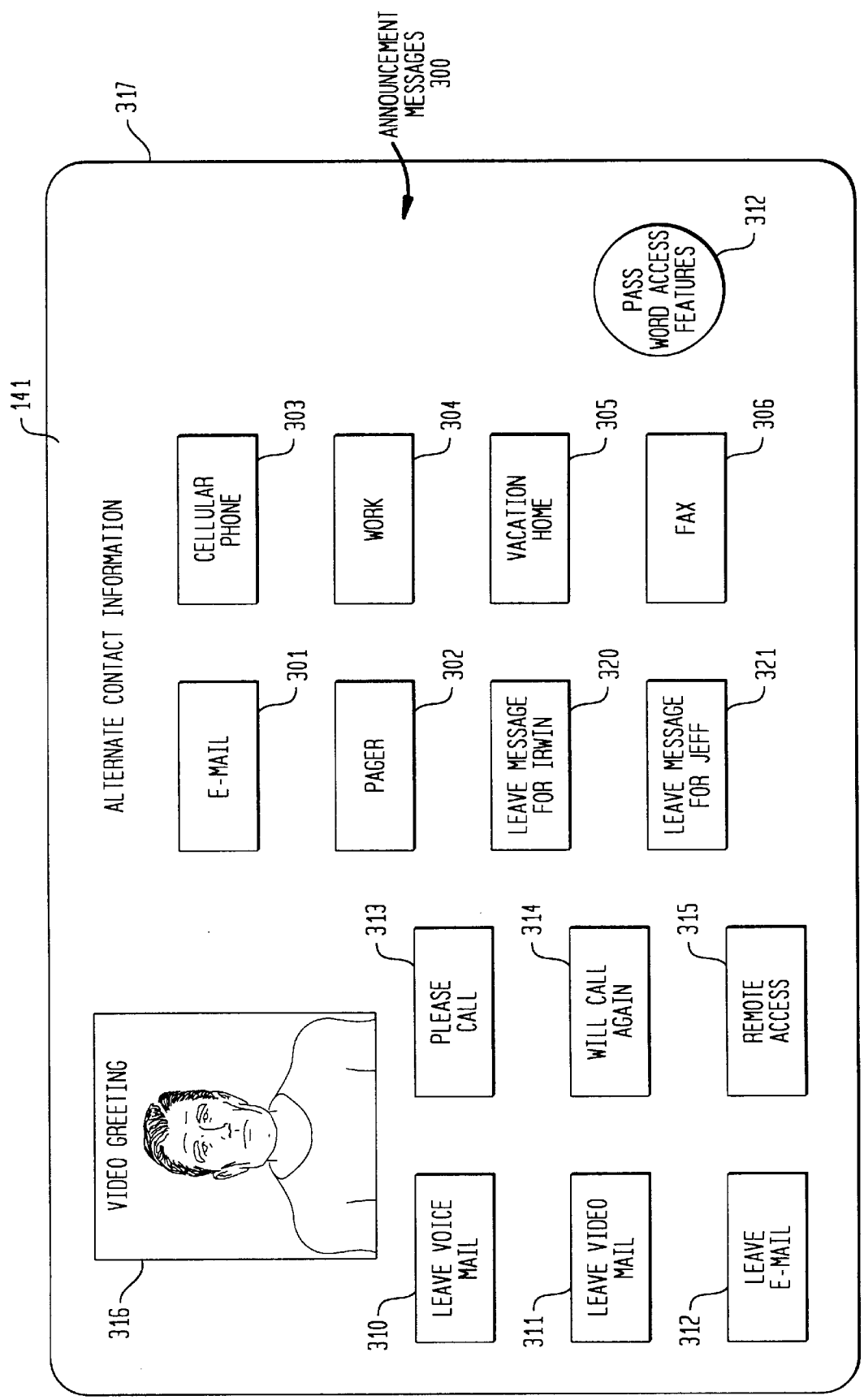
FIGS. 6–9 illustrate various exemplary multimedia announcement messages that may be generated by the video phone upon receiving a call.

Referring to FIG. 6, announcement messages 300 may be variously configured to include one or more of the following either alone or in any combination: a video greeting 316 recorded via the camera 145; a video greeting downloaded from a video playing device such as a digital video camera; a stock video greeting obtained from a compact disc (not shown), a stock video greeting/image obtained from the NSP 36 via the ISD 22 and FP 32 (e.g., a holiday or seasonal greeting—Christmas, Thanksgiving, winter, summer, fall, movie star greeting a well known movie star, etc.); a still image or photograph scanned in via the scanner 152; an audio only greeting; stock greeting layouts obtained either locally (via a storage medium, RAM card inserted via smart reader 147, locally attached CD ROM (not shown)) and/or remotely from the NSP; greetings generated locally by the user; greetings which include one or more of the following control buttons and/or announcements: the video greeting 316 to answer the incoming call, leave voice mail 310 to allow an incoming caller to leave a voice mail message, leave video mail 311 to allow an incoming caller to leave a video mail message, leave E-mail 312 to allow an incoming caller to leave an E-mail message, please call 313 to allow a caller to simply push a button on the video phone to leave a stock message to the receiving party using either a caller identification number or a number entered by the calling party, will call again 314 to allow a caller to simply push a button on his or her video phone to leave a stock message identified using a caller identification and a name spoken and/or typed by the user; secondary user buttons 320, 321 to provide one touch direct access to an individual mail box and/or secondary greeting of another resident of the called location; and/or a plurality of alternate contact buttons 317 to provide direct access via pressing one of the buttons to alternate contact information for the called party such as an E-mail interface button 301, and/or a plurality of speed dial buttons for automatically dialing various devices such as a pager 302 (including sending of the calling parties number), cellular phone 303, work phone 304, vacation home 305, and/or facsimile machine 306; and/or a password protected access button 318 to provide the owner of the video phone access to various control features of the answering machine.

Figure 7:
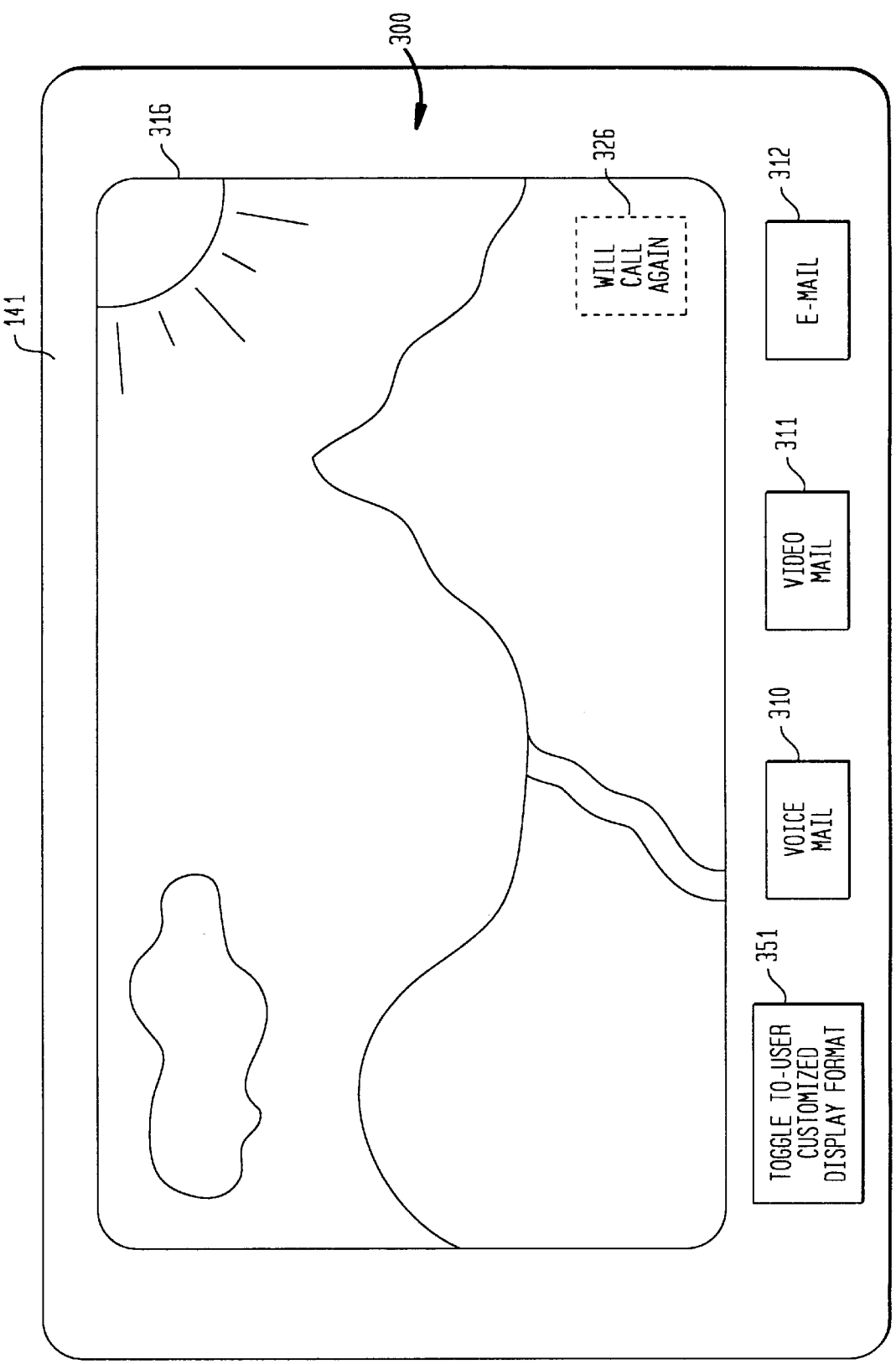

Referring to FIG. 7, is can be seen that the greeting 316 may be any suitable size. For example, the greeting 316 may form a background over either all or substantially all of the screen 141. The greeting 316 may have one or more keys 326 overlayed over the greeting and/or disposed about the border of the greeting 316. The announcement message may include a toggle button 351 for switching between a standard display format and a user-customized display format, as will be described below.

Figure 8:
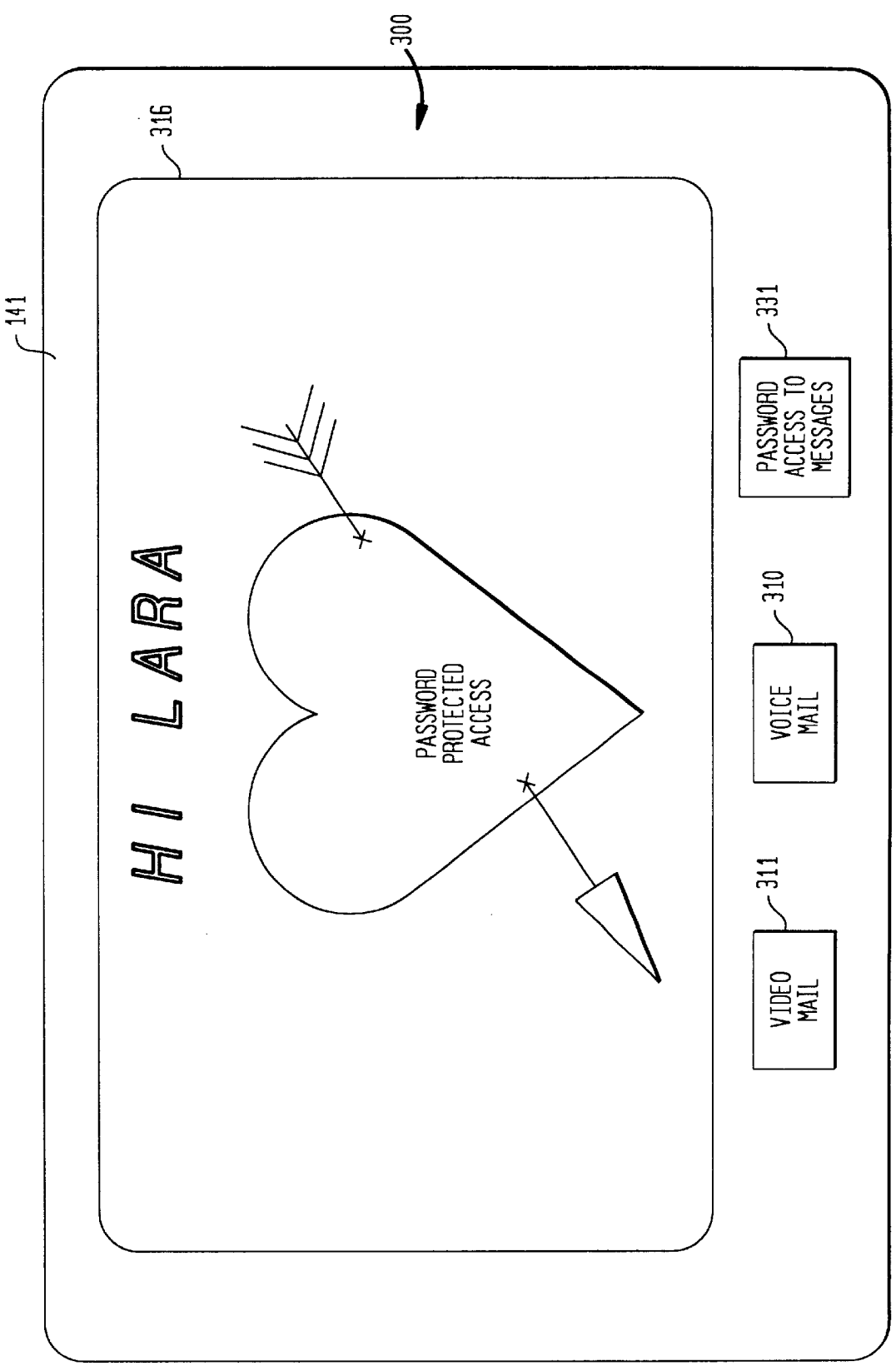

Referring to FIG. 8, the greeting may be customized for a particular caller identification. For example, where the calling location of the users girl friend is known, the user may customize his screen to play a special message to the calling party. Different screens may be shown to the called parties parents, friends, girl friend, siblings, boss, and people unknown to the called party. In the example illustrated in FIG. 8, the calling party is someone named LARA. In the exemplary embodiment shown in FIG. 8, the greeting 316 occupies substantially all of the video screen 141. Various items may be overlayed on the screen including the ability to leave video mail 311, voice mail 310, and/or enter password protected areas such as messages 331 and/or photos etc., 332. The password protected access nomenclature may or may not appear on the screen depending on the called parties preference. Where password protection access is used, the called party may give the calling party access to private numbers, pictures, video clips, and/or messages, etc.

Figure 9:
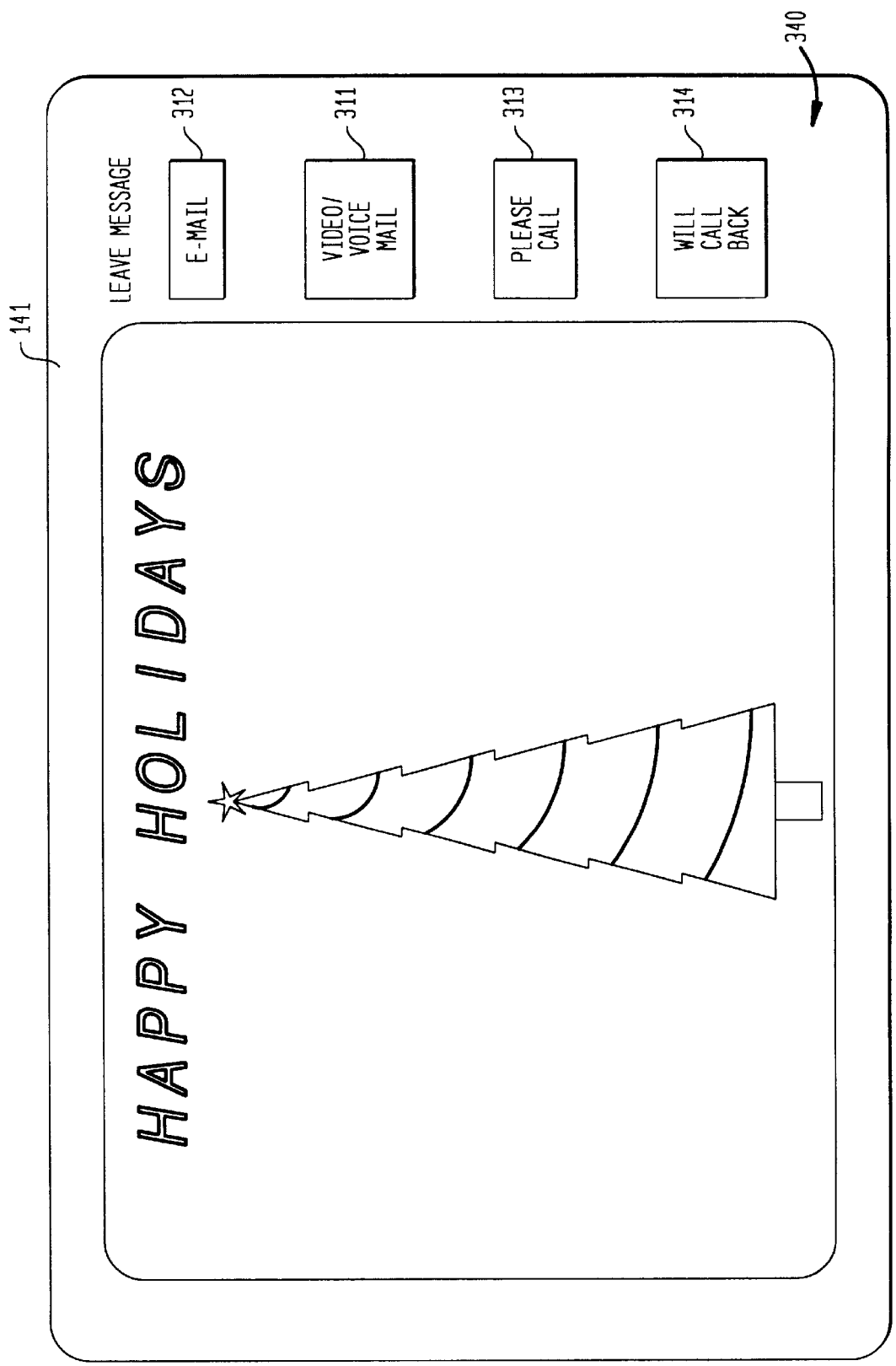

A further exemplary embodiment is shown in FIG. 9. In this embodiment, the called party may use seasonal and/or special occasion greetings which are either programmed into the video phone at the time or pre-stored to prevent forgetting an occasion. For example, the called party can program his video phone to read an internal or remote clock (not shown) and obtain data about the current date and time. Further, in a programming screen, the called party may specify certain greetings to be displayed during certain times, during certain days, during certain ranges of days, and/or for certain caller IDs based on certain times, certain days, and/or certain ranges of days. For example, the embodiment illustrated in FIG. 9 shows a seasonal announcement message such as a Christmas tree as the video greeting 316. The seasonal announcement message may be programmed to appear during certain days such as between November 29 and December 31. Thereafter, a new-years greeting could be scheduled to appear during the first month of the year. Different seasonal greetings and/or random greetings selected from a NSP and/or other database could be selected to be displayed on the screen. In this manner, more creative individuals could both customize their greeting with minimal effort and give the appearance of having a completely up-to-date greeting. As an example, where an individual knows that he or she goes home at 5:00 pm each day, the individual can leave after hours contact information and/or other customized announcement message which automatically appears between 5:00 pm and 8:00 am each day.

In addition to the above, the greeting may be customized for a combination of a particular caller identification and date. For example, a called party may set his office answering machine to detect his wife's caller identification and display a happy anniversary message when his wife called the office. Similarly, an individual may use a separate message when he is working at home than when he is in the office. Further, the video phone may be programmed to call an individual on a specified date and time to send a reminder message and/or anniversary greeting to that person.

Figure 10:
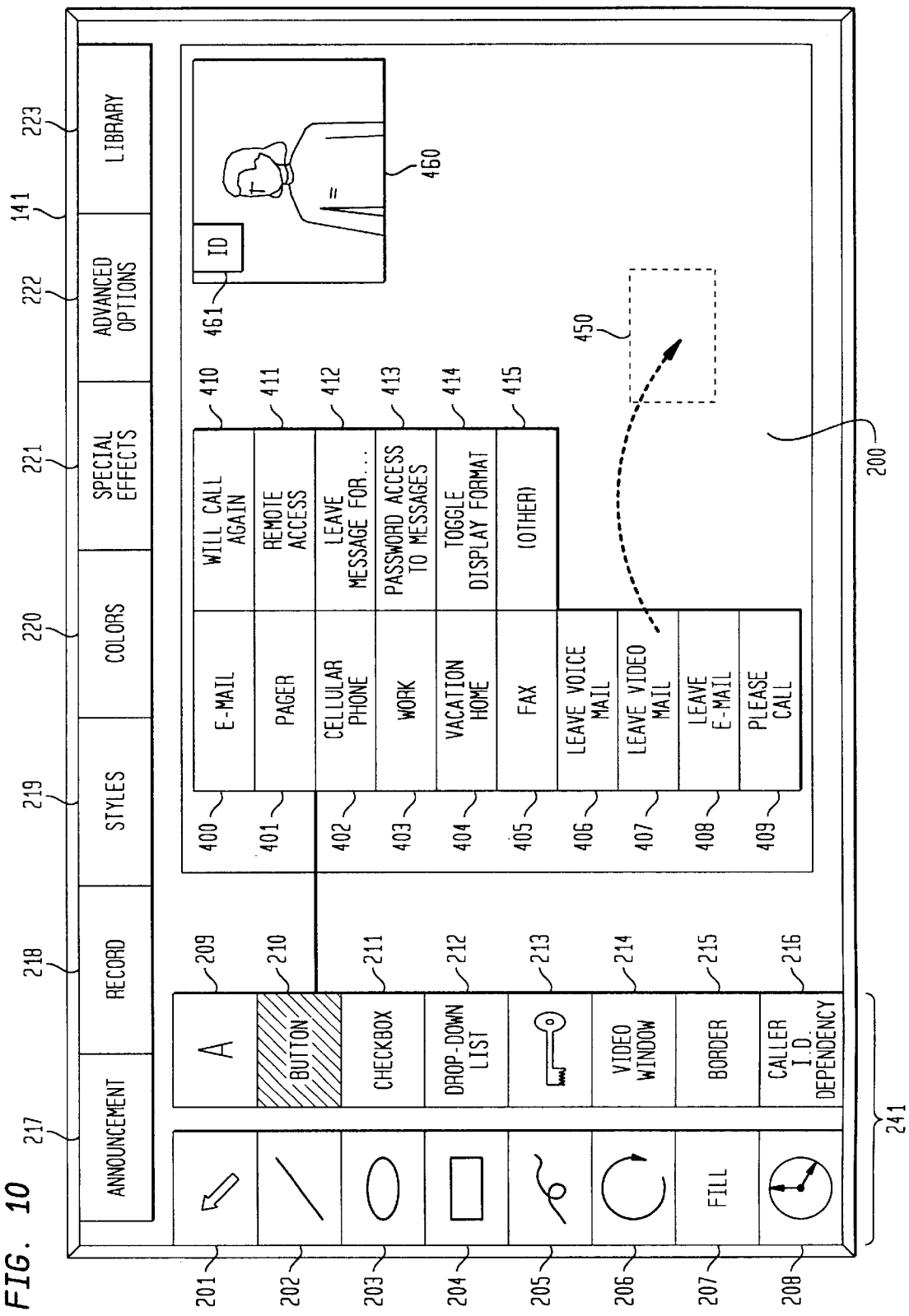

To add an object, a user may select any of the tools on the toolbar 241. In exemplary embodiment, a user may select the button tool 210 (e.g., by tapping on the button) shown in FIG. 5. Then as shown in FIG. 10, a menu 242 of the available buttons may appear, which may include various selections 400–415 for selecting various buttons 301–306, 310–315, 320, 321, 331, 350, 353, 354, as well as other user-definable buttons. FIG. 10 shows a user selecting the leave video mail selection 407 and dragging across the screen to an area 450 of the user's choice. FIG. 10 also shows a video window 460 associated with a caller identification dependency icon 461. Some or all of the objects may be added to the announcement message in a similar way.

Figure 11:
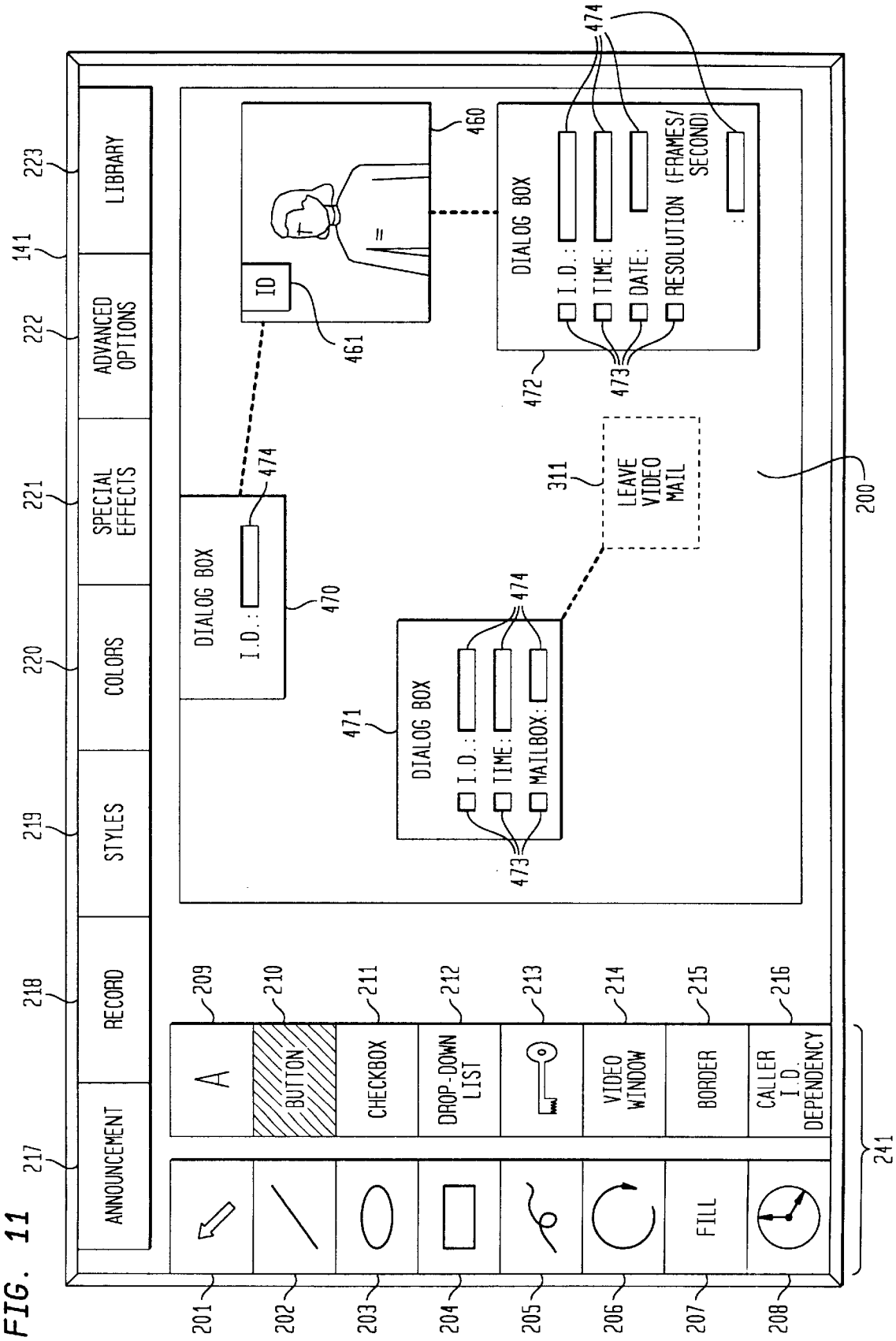

Once an object is added, the user may configure the object. In the exemplary embodiment illustrated in Fi& 11, the user has added the leave video mail button 311, the video window 460, and the caller identification dependency icon 461 associated with the video window 460. The user may select an object (e.g., by tapping the object) and a dialog box may appear. FIG. 11 shows a dialog box 470 appearing for the caller identification dependency icon 461, a dialog box 471 appearing for the leave video mail button 311, and a dialog box 472 appearing for the video window 460. One or more dialog boxes may appear for any given selected object. Some dialog boxes may include checkboxes 473 and/or text input areas 474. For example, when configuring the caller identification dependency icon 461, the user might enter one or more caller identifications into the text input area 474 of the dialog box 470. An alternate method of creating a dependency, for instance, for the video window 460 may be to check the I.D. checkbox 473 in its dialog box 472 and enter caller identification information into its associated text input area 474. Some or all of the objects may be configured in similar ways.

Figure 12:
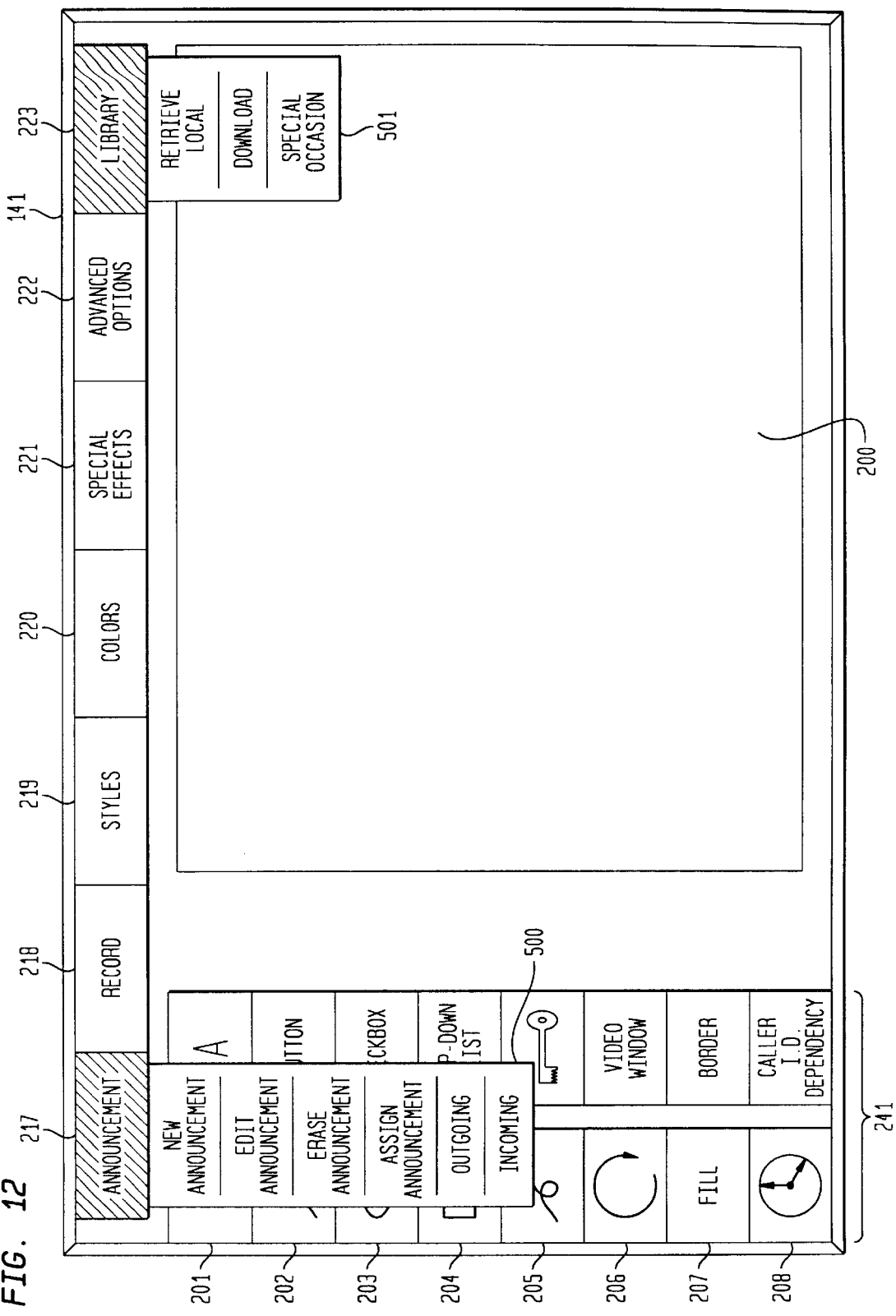

Referring to FIG. 12, one or more drop down function sets may appear when a drop-down menu is selected (e.g., by tapping on the drop-down menu box). For example, when the user selects the drop-down announcement menu 217, a function set 500 may appear. The function set 500 may offer functions such as creating a new announcement message, editing an existing announcement message, erasing an existing announcement message, assigning an announcement message to a particular user, viewing an announcement message using an outgoing view, and viewing an announcement message using an incoming view. If the user selects the library drop-down menu 223, a function set 501 may appear offering functions such as retrieving objects and/or announcement messages from local storage (e.g., stored within the CPE 10 and/or the IDS 22), downloading objects and/or announcement messages from a server (e.g., the FMP 32 and/or the ISD 36), and/or retrieving and/or downloading special occasion announcement messages and/or templates (e.g., for Chanukah, Christmas, New Year's Day, etc.).

Figure 13:
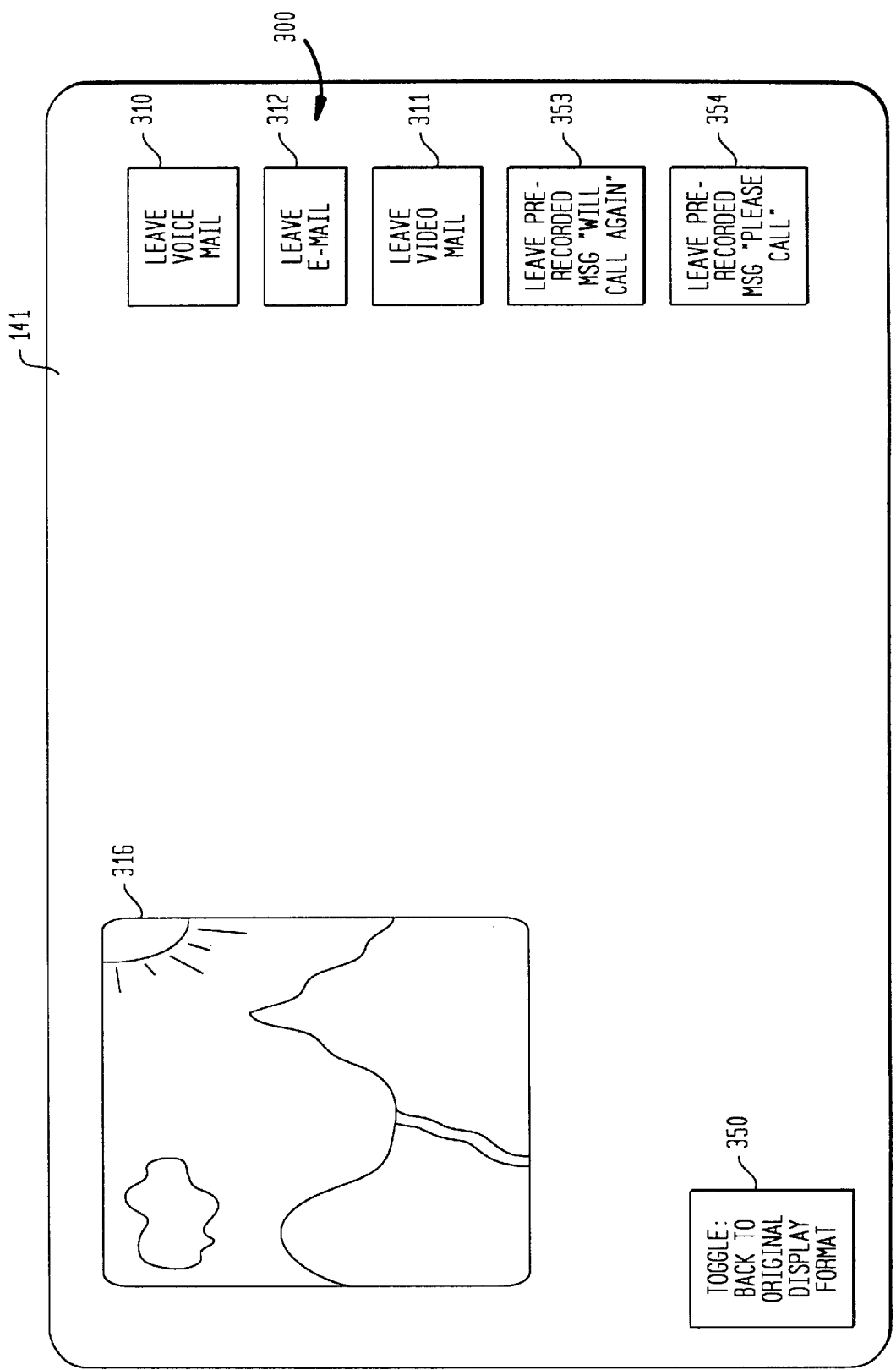
FIG. 13 illustrates an exemplary multimedia announcement message that may be generated by the video phone upon receiving a call.

As a further embodiment of the invention, because the announcement messages may be customized, it is often difficult for a receiving party to find the particular buttons in order to formulate a response. Accordingly, the processor or controller 170 in the video phone 130 may be configured to reformat the incoming message to a consistent format regardless of the announcement message sent by the calling party. In this manner, the called party may program his video phone to always display announcement messages in the same format. The video greeting is always the same size and displayed on the video phone in the same location. Similarly, the response buttons are always the same size and/or located in the same location so that the calling party does not have to search through a new display each time that he calls a different party. For example, the announcement message sent by the called party may appear as that shown in FIG. 13. However, the called party may program the processor 170 in the video phone 130 to reformat the display to a consistent display format as shown in FIG. 6. Of course, the consistent display format is optional and the called party may toggle back and forth. In the embodiment shown in FIG. 13, the video phone screen may include a toggle button 350, 351 which allows the called party to toggle back and forth between the original display format of the announcement message and the consistent display format which the user is used to seeing.

A user may view, create, and/or edit a user-customized display format by selecting, for example, the announcement drop-down menu 217 and the incoming function of the associated function set 500. Furthermore, the toggle button 350, 351 may be created by selecting, for example, the button tool 210 and the toggle display format selection 414.

The following applications are hereby incorporated by reference:

1. A Hybrid Fiber Twisted-pair Local Loop Network Service Architecture, U.S. application Ser. No. 09/001,360, filed Dec. 31, 1997;
2. Dynamic Bandwidth Allocation for use in the Hybrid Fiber Twisted-pair Local Loop Network Service Architecture, U.S. application Ser. No. 09/001,425, filed Dec. 31, 1997;
3. The VideoPhone, U.S. application Ser. No. 09/001,905, filed Dec. 31, 1997;
4. VideoPhone Privacy Activator, U.S. application Ser. No. 09/001,909, filed Dec. 31, 1997;
5. VideoPhone Form Factor, U.S. application Ser. No. 09/001,583, filed Dec. 31, 1997;
6. VideoPhone Centrally Controlled User Interface With User Selectable Options, U.S. application Ser. No. 09/001,576, filed, Dec. 31, 1997; ABANDONED
7. VideoPhone User Interface Having Multiple Menu Hierarchies, U.S. application Ser. No. 09/001,908, filed Dec. 31, 1997, now abandoned;
8. VideoPhone Blocker, U.S. Pat. No. 5,949,474, issued on Sept. 7, 1999;
9. VideoPhone Inter-com For Extension Phones, U.S. application Ser. No. 09/001,358, filed Dec. 31, 1997;
10. Advertising Screen Saver, U.S. Pat. No. 6,084,583, issued on Jul. 4, 2000;
11. Information Display for Visual Communication Device, U.S. Pat. No. 6,222,520, issued on Apr. 24, 2001;
12. VideoPhone Multimedia Announcement Answering Machine, U.S. application Ser. No. 09/001,911, filed Dec. 31, 1997;
13. VideoPhone Multimedia Announcement Message Toolkit, U.S. application Ser. No. 09/001,345, filed Dec. 31, 1997;
14. VideoPhone Multimedia Video Message Reception, U.S. application Ser. No. 09/001,362, filed Dec. 31, 1997, now abandoned;
15. VideoPhone Interactive Corporate Menu Answering Machine Announcement, U.S. Pat. No. 6,226,362, issued on May 1, 2001;
16. VideoPhone Multimedia Interactive On-Hold Information Menus, U.S. Pat. No. 6,020,916, issued on Feb. 1, 2000;
17. VideoPhone Advertisement When Calling Video Non-enabled VideoPhone Users, U.S. application Ser. No. 09/001,361, filed Dec. 31, 1997;

18. Motion Detection Advertising, U.S. application Ser. No. 09/001,355, filed Dec. 31, 1997;
19. Method and system for supporting Interactive Commercials displayed on a display device using a telephone network, U.S. Pat. No. 6,178,446, issued on Jan. 23, 2001;
20. Video communication device providing in-home Catalogue Services, U.S. Pat. No. 5,970,473, issued on Oct. 19, 1999;
21. A Facilities Management Platform For Hybrid Fiber Twisted-pair Local Loop Network, Service Architecture, U.S. application Ser. No. 09/001,422, filed Dec. 31, 1997;
22. Life Line Support for Multiple Service Access on Single Twisted-pair, U.S. application Ser. No. 09/001,343, filed Dec. 31, 1997;
23. A Network Server Platform (NSP) For a Hybrid Fiber Twisted-pair (HFTP) Local Loop Network Services Architecture, U.S. Pat. No. 6,229,810, issued on May 8, 2001;
24. A Communication Server Apparatus For Interactive Commercial Service, U.S. application Ser. No. 09/001,344, filed Dec. 31, 1997;
25. NSP Based Multicast Digital Program Delivery Services, U.S. application Ser. No. 09/001,580, filed Dec. 31, 1997;
26. NSP for Internet, JAVA Server and Video Application Server, U.S. Pat. No. 6,044,403, issued on Mar. 28, 2000;
27. NSP WAN Interconnectivity Services for Corporate Telecommuting, U.S. application Ser. No. 09/001,540, filed Dec. 31, 1997;
28. NSP Telephone Directory White-Yellow Page Services, U.S. Pat. No. 6,052,439, issued on Apr. 18, 2000;
29. NSP Integrated Billing System For NSP services and Telephone services, U.S. application Ser. No. 09/001,359, filed Dec. 31, 1997;
30. Network Server Platform/Facility Management Platform Caching Server, U.S. appliction Ser. No. 09/001,419, filed Dec. 31, 1997;
31. An Integrated Services Director (ISD) Overall Architecture, U.S. application Ser. No. 09/001,417, filed Dec. 31, 1997;
32. ISD/VideoPhone (Customer Premise) Local House Network, U.S. application Ser. No. 09/001,418, filed Dec. 31, 1997, now ABANDONED;
33. ISD Wireless Network, U.S. application Ser. No. 09/001,363, filed Dec. 31, 1997;
34. ISD Controlled Set-Top Box, U.S. application Ser. No. 09/001,424, filed Dec. 31, 1997;
35. Integrated Remote Control and Phone, U.S. application Ser. No. 09/001,423, filed Dec. 31, 1997;
36. Integrated Remote Control and Phone User Interface, U.S. application Ser. No. 09/001,420, filed Dec. 31, 1997;
37. Integrated Remote Control and Phone Form Factor, U.S. Pat. No. 6,292,210, issued Sep. 18, 2001;
38. VideoPhone Mail Machine, U.S. Provisional application Ser. No. 60/070,104, filed Dec. 31, 1997, now U.S. application Ser. No. 09/218,171 filed Dec. 22, 1998;
39. Restaurant Ordering Via VideoPhone, U.S. Provisional application Ser. No. 60/070,121, filed Dec. 31, 1997, now U.S. application Ser. No. 09/218,171 filed Dec. 22, 1998;
40. Ticket Ordering Via VideoPhone, U.S. Provisional application Ser. No. 60/070,103, filed Dec. 31, 1997, now U.S. application Ser. No. 09/218,171 filed Dec. 22, 1998;
41. Multi-Channel Parallel/Serial Concatenated Convolutional Codes And Trellis Coded Modulation Encoder/Decoder, U.S. Pat. No. 6,088,387, issued on Jul. 11, 2000;
42. Spread Spectrum Bit Allocation Algorithm, U.S. application Ser. No. 09/001,842filed Dec. 31, 1997;
43. Digital Channelizer With Arbitrary Output Frequency, U.S. application Ser. No. 09/001,581, filed Dec. 31, 1997;
44. Method And Apparatus For Allocating Data Via Discrete Multiple Tones, U.S. Pat. No. 6,134,274, issued on Oct. 17, 2000;
45. Method And Apparatus For Reducing Near-End Cross Talk In Discrete Multi-Tone Modulators/Demodulators, U.S. Pat. No. 6,144,695, issued Nov. 7, 2000.

In addition, the following two patent applications are hereby incorporated by reference:
1. U.S. pat. No. 6,061,326 issued on May 9, 2000, entitled Wideband Communication System for the Home, to Robert R. Miller, II and Jesse E. Russell, and
2. U.S. pat. No. 6,111,895 issued on Aug. 29, 2000, entitled Wide Band Transmission Through Wire, to Robert R. Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

What is claimed is:

1. A video phone answering machine, comprising:
a toolkit used for creating or modifying a video announcement message the toolkit including at least one object tool for creating, adding or manipulating an object in a video announcement message,
wherein the toolkit includes one or more object tools for configuring an object to appear in a video message based on a comparison of pre-stored criteria with a current date.

2. In a video phone answering machine, a toolkit used for creating or modifying a video announcement message, the toolkit including:
at least one object tool for creating, adding or manipulating an object in a video announcement message, and
at least one modification tool for modifying an incoming video announcement message,
wherein the object is a video window.

3. In a video phone answering machine, a toolkit used for creating or modifying a video announcement message, the toolkit including:
at least one object tool for creating, adding or manipulating an object in a video announcement message, and
at least one modification tool for modifying an incoming video announcement message,
wherein the object is a button.

4. A computer-readable medium having computer-executable instructions for performing steps comprising:
allowing a user to create at least one of a plurality of objects, the objects defining a video announcement message, the video announcement message appearing to a caller;
allowing the user to manipulate at least one of the objects; and
allowing a user to modify an incoming video announcement message,
wherein the instructions for allowing the user to create include instructions for allowing the user to create a button.

5. A computer-readable medium having computer-executable instructions for performing steps comprising:

allowing a user to create at least one of a plurality of objects, the objects defining a video announcement message, the video announcement message appearing to a caller;

allowing the user to manipulate at least one of the objects; and allowing a user to modify an incoming video announcement message, wherein the instructions for allowing the user to create include instructions for allowing the user to create a video window.

6. A video phone answering machine, comprising:

a toolkit used for creating or modifying a video announcement message, the toolkit including at least one object tool for creating, adding or manipulating an object in a video announcement message, wherein the object tools are for creating or manipulating an object selected from the group consisting of: shapes, figures, drawings, dependency icons, checkboxes, drop-down lists, borders, and background images.

7. A video phone answering machine, comprising:

a toolkit used for creating or modifying a video announcement message, the toolkit including at least one object tool for creating, adding or manipulating an object in a video announcement message, wherein the object tools are for creating or manipulating an object selected from the group consisting of an object allowing an incoming caller to obtain direct access to a greeting of another call destination, an object allowing an incoming caller to connect to alternate information for a call recipient, and an object to provide an incoming caller with access to a control feature of the video phone.

8. A computer-readable medium having computer-executable instructions for performing steps comprising:

allowing a user to create at least one of a plurality of objects, the objects defining a video announcement message, the video announcement message appearing to a caller; and allowing the user to manipulate at least one of the objects;

wherein the instructions include instructions selected from the group consisting of: instructions for allowing a user to draw objects, instructions for allowing a user to fill enclosed objects with a color or pattern, instructions for allowing a user to apply a date dependency to an object, instructions for allowing a user to create a checkbox, instructions for allowing a user to create a drop-down list, instructions for allowing a user to provide password protection, instructions for creating a border, and instructions for allowing a user to provide special effects.

9. A computer-readable medium having computer-executable instructions for performing steps comprising:

allowing a user to create at least one of a plurality of objects, the objects defining a video announcement message, the video announcement message appearing to a caller; and allowing the user to manipulate at least one of the objects;

wherein the instructions include instructions for creating or manipulating an object selected from the group consisting of: shapes, figures, drawings, checkboxes, drop-down lists, borders, and background images.

10. A computer-readable medium having computer-executable instructions for performing steps comprising:

allowing a user to create at least one of a plurality of objects, the objects defining a video announcement message, the video announcement message appearing to a caller; and allowing the user to manipulate at least one of the objects;

wherein the instructions include instructions for creating or manipulating an object selected from the group consisting of: an object allowing an incoming caller to obtain direct access to a greeting of another call destination, an object allowing an incoming caller to connect to alternate information for a call recipient, and an object to provide an incoming caller with access to a control feature of the video phone.

* * * * *